United States Patent [19]
Phillips et al.

[11] 3,726,321
[45] Apr. 10, 1973

[54] FLEXIBLE HOSE

[75] Inventors: Alfred R. Phillips, Waynesville, John S. Haley, Lake Junaluska, both of N.C.; Edward A. Clifton, Englewood, Ohio

[73] Assignee: Dayco Corporation, Dayton, Ohio

[22] Filed: Feb. 19, 1971

[21] Appl. No.: 116,990

[52] U.S. Cl..................................138/123, 138/125
[51] Int. Cl.................................................F16l 11/08
[58] Field of Search....................138/123, 124, 125; 156/60; 161/139

[56] References Cited

UNITED STATES PATENTS

| | | | |
|---|---|---|---|
| 2,851,389 | 9/1958 | Lappala | 161/139 X |
| 3,116,760 | 1/1964 | Matthews | 138/125 |
| 3,332,447 | 7/1967 | Holmgren | 138/125 |
| 3,578,028 | 5/1971 | Roberts | 138/123 |

*Primary Examiner*—Martin P. Schwadron
*Assistant Examiner*—David R. Matthews
*Attorney*—Reuben Wolk

[57] ABSTRACT

An improved high pressure flexible hose and method of making same are provided by providing a flexible plastic tube and applying a layer of an elastomeric adhesive on the outside surface of the tube. An outer cover is braided against the layer of adhesive and the adhesive allowed to set. The properties of the adhesive are such that upon bending the hose the adhesive serves as an elastic connection between the tube and the braided cover to thereby provide improved service life for the hose even under adverse operating conditions.

10 Claims, 5 Drawing Figures

PATENTED APR 10 1973 3,726,321
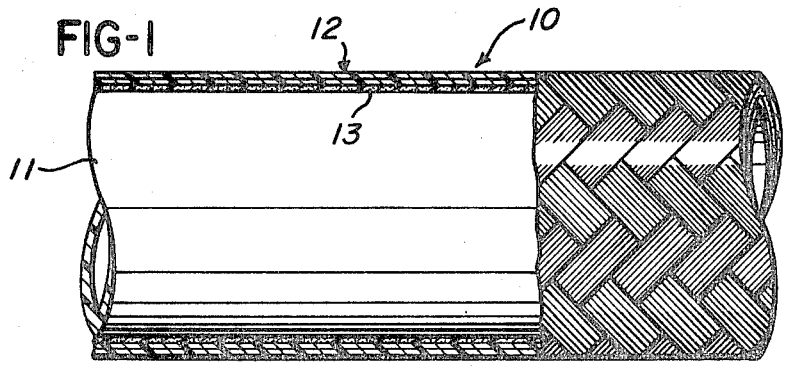
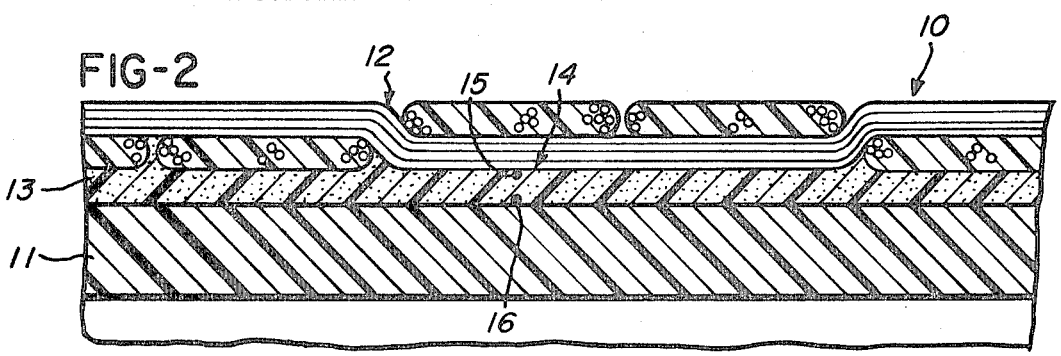
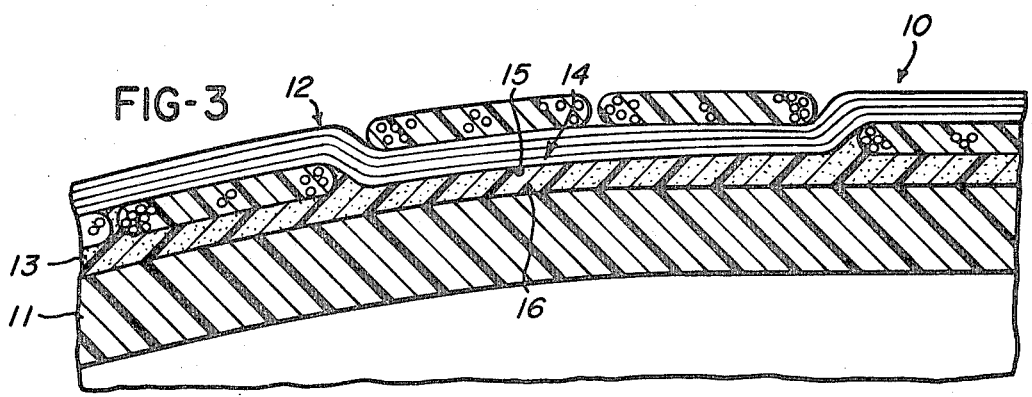
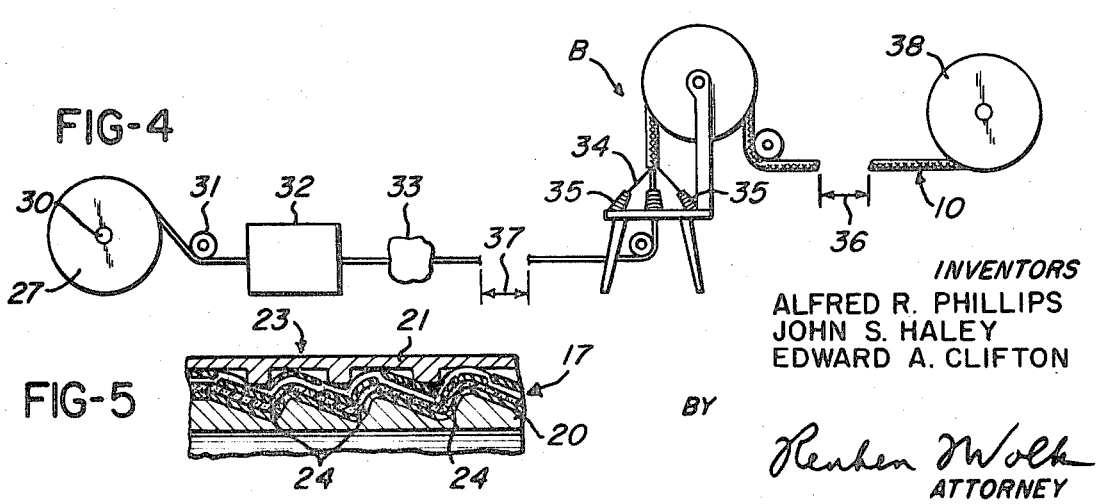
INVENTORS
ALFRED R. PHILLIPS
JOHN S. HALEY
EDWARD A. CLIFTON
BY
Reuben Wolk
ATTORNEY

FLEXIBLE HOSE

BACKGROUND OF THE INVENTION

Many high pressure hoses in current use are each comprised of an inner plastic tube which has an outer cover braided tightly thereagainst and such cover is held in position merely by the compressive forces that it exerts against the tube and by friction; however, upon flexing or bending a hose of this character the filaments comprising the braided cover are subjected to large forces which cause failures.

Other currently used high pressure hoses employ adhesives which are cured to provide a bond between a plastic tube and an associated braided layer or outer cover. These cured adhesives form a substantially rigid connection between a braided outer cover and its plastic inner tube, for example, whereby once each of these hoses is subjected to high pressures and flexing movements, the associated cured adhesive tends to break or crack and also cause the reinforcing filaments of the braided cover to fail causing failure of the associated hose.

Still other currently used high pressure hoses employ softening or solvating materials which serve to plasticize the surface of an associated inner plastic tube whereupon an outer cover is braided in position thereagainst. However, the solvating agent in most of these types of hoses attacks the filaments of such cover and, thus, weakens the overall hose. In addition, these "solvent type" hose constructions result in embedment of the filaments of an outer cover in the plasticized portion of a tube and once the plasticized portion solidifies, the resulting hose has what amounts to a prestressed outer cover, is very stiff, and is comparatively weak.

SUMMARY

This invention provides an improved high pressure flexible hose and method of making same by providing a flexible plastic construction which may be in the form of a plastic tube and applying a layer of an elastomeric adhesive on the outside surface of the tube. An outer cover is braided against the layer of adhesive and the adhesive is allowed to set. The elastomeric properties of the adhesive provide a resilient elastic connection between the tube and the braided cover and enable the hose to be used under severe bending and pressure conditions.

Other details, uses, and advantages of this invention will be readily apparent from the exemplary embodiment thereof presented in the following specification, claims, and drawing.

BRIEF DESCRIPTION OF THE DRAWING

The accompanying drawing shows a present exemplary embodiment of this invention, in which FIG. 1 is a perspective view with parts in cross-section and parts broken away illustrating a fragmentary portion of an exemplary hose made in accordance with this invention;

FIG. 2 is an enlarged fragmentary cross-sectional view of the hose of FIG. 1 with the hose in a relaxed or unbent condition;

FIG. 3 is a view similar to FIG. 2 illustrating the hose in a bent condition and showing the manner in which the elastomeric adhesive provides an elastic connection between an inner plastic tube and a braided cover comprising the hose;

FIG. 4 is a schematic presentation particularly illustrating a series of method steps which may be used to make the hose of FIG. 1; and FIG. 5 is a view similar to FIG. 2 and to a smaller scale illustrating an end portion of the hose of FIG. 1 sandwiched between components of a hose connector assembly to illustrate the severe flexing imposed thereon by such components with such flexing requiring a high quality elastic connection between components of the hose.

DESCRIPTION OF ILLUSTRATED EMBODIMENT

Reference is now made to FIG. 1 of the drawing which illustrates an exemplary high pressure flexible hose of this invention which is designated generally by the reference numeral 10. The hose 10 is comprised of a flexible tubular construction in the form of a plastic inner tube 11 and a braided outer cover 12 which is fastened to the inner tube by an elastomeric adhesive 13 which in this example is shown as a layer between the tube 11 and cover 12 and is also designated by the numeral 13.

The plastic tube 11 is finally sized so that both its inside surface area and its outside surface area are at their design values. Upon applying the elastomeric adhesive 13 on the outside surface of the tube 11, braiding the outer cover 12 in position, and allowing such adhesive to set the inside diameter and surface area of the tube 11 and hose 10 thus defined remain substantially the same.

The elastomeric adhesive 13 has unique properties which assure that the hose 10 may be operated even under severe conditions of flexing, bending, rapid oscillations, or internal pressure fluctuations without damage thereto. In particular, the layer of adhesive 13 in the completed hose 10 remains "noncured" and is thus distinguished from cured or solidified adhesives used with previous hose constructions of the "cured type" or "solvent type."

The layer of adhesive 13 has optimum adhesive properties and serves to bond the braided cover 12 to the outside surface of the tube 11 as an integral unit as shown at location 14. The adhesive 13 also has optimum cohesive properties making it highly elastic and resilient when compared to previously used adhesives. The properties of adhesive 13 are such that with a portion of the hose 10 in an unbent condition as shown in FIG. 2, two points 15 and 16 of such adhesive are aligned vertically. Once the hose 10 is bent, for example, rather than rupturing the adhesive 13 at a location under bending stress, the adhesive serves as an elastic connection between the tube 11 and the cover 12 holding these components together in a high strength manner. This feature is illustrated schematically in FIG. 3 which shows the hose section which includes location 14 in a bent or flexed condition whereby it is apparent that the adhesive 13 has been stretched and points 15 and 16 are moved out of vertical alignment. Once the section of hose which includes location 14 is restored to its original unbent condition, as in FIG. 2, points 15 and 16 are again in vertical alignment.

The improved elastic connection provided between the tube 10 and cover 12 by the elastomeric adhesive 13 assures that the hose 10 may be subjected to severe bending and distortion imposed thereon by an associated hose connector assembly without damage thereto, see FIG. 5. In particular, an end portion 17 of a hose 10 may be fixed between cooperating components 20 and 21 of a connector assembly 23 without separation of the adhesive 13 from the tube 10 and cover 12 or rupture of such adhesive at the usual highly stressed fatigue areas indicated at 24.

The noncured elastomeric adhesive 13 may be of several types and three exemplary types are presented in this disclosure.

One of these three exemplary types is basically a pressure sensitive adhesive 13 which adheres tenaciously upon application of only light finger pressure. To assure that this adhesive 13 has the desired adhesive properties it is comprised of low molecular weight polyvinyl ethyl ether resins. The cohesive properties of adhesive 13 are obtained by employing high molecular weight polyvinyl ethyl ether resins suitably blended with phenolic resins.

The resins are blended in a suitable solvent such as methyl ethyl ketone, toluene, or the like, and the amounts of the three basic resins employed may be varied to obtain the desired characteristics for the adhesive 13 as dictated by the environmental and operating requirements for the hose 10. A typical example of the materials comprising the pressure sensitive adhesive 13 which may be used to make the hose 10 of this invention is illustrated below wherein materials comprising such adhesive are listed together with a range of parts or units by weight for each material.

EXAMPLE

| MATERIAL | PARTS BY WEIGHT |
| --- | --- |
| Low Molecular weight Vinyl Ethyl Ether | 25 to 75 parts |
| High Molecular Weight Vinyl Ethyl Ether | 25 to 75 parts |
| Phenolic Resin | 10 to 100 parts |
| Solvent | As Needed |

Another of the three exemplary types of adhesive 13 is a solvent release adhesive which is often popularly referred to as a "contact adhesive." This adhesive is usually a blend of an uncured elastomer such as natural or synthetic rubber, for example, with stabilizers and appropriate solvents. Preferably the elastomer should be capable of a high degree of hydrogen bonding to provide the desired bond strength. One example of this type of cement is sold by the Springfield Manufacturing Company of Greenville, South Carolina, under the trade name of "Spring-Feel Cement."

The third of the above-mentioned exemplary types of adhesive cement 13 is a hot melt adhesive which is essentially a solid thermoplastic material that is applied in a molten state and develops maximum adhesion upon cooling back to its solid state. A typical hot melt adhesive is commonly comprised of resins such as coumarone-indenes, polyamides, alkyds, or terpenes suitably reinforced by materials such as ethyl cellulose, polyisobutylene and butyl methacrylates.

As in the case of a solvent release adhesive, the hot melt adhesive should have good hydrogen bonding characteristics. An example of such a hot melt adhesive is sold by Imperial Adhesives & Chemicals, Inc., of 6315 Wiehe Road, Cincinnati, Ohio, under the trade name of "No. 2100 Adhesive."

Having presented examples of the adhesive 13, the detailed description will now proceed with a presently preferred method employed to make the hose 10, and for this description reference is made to FIG. 4 of the drawing.

The completely formed tube 11 is unwound from a supply roll 27 thereof which is suitably supported for unwinding rotation on a central shaft 30. The tube 11 is guided by a roller 31 into a tank 32 where its outside surface is coated with adhesive 13. Any excess adhesive 13 is wiped from the outside surface of the tube 11 at a wiping station 33.

The flexible tube 11 proceeds through a conventional braiding machine or braider B where continuous filament yarn such as nylon yarn 34, for example, carried on a plurality of spools 35 is braided over the layer of adhesive 13 in a conventional manner. After braiding, the adhesive 13 is allowed to set and this setting may be achieved by allowing a predetermined length, such as a length indicated at 36, thereof to be exposed to normal room temperatures and conditions. After setting, the completed hose 10 may be wound on a take-up roll 38.

To assure that the migration of adhesive 13 into the yarn 34 and, hence, the braided cover 12 is kept at a minimum, the ratio of resins to solvent (i.e., the viscosity of the adhesive) is controlled within desired limits. Also, in some applications, and depending on the type of adhesive used, a predetermined length 37 of the tubing 11 with the adhesive 13 applied thereon is subjected to a controlled environment (which may be normal room temperature and conditions) to allow some of the solvent to leave the adhesive prior to braiding the cover 12 in position thereagainst.

However, in every instance the adhesive 13 between the tube 11 and cover 12 in the final hose 10 is basically noncured and has optimum elasticity and resiliency. Further, the construction of hose 10 is superior because the adhesive 13 will not break or fail even during severe flexing or bending of the hose 10 and such construction is superior to hose constructions in which the reinforcing layer or cover is not bonded to the inner tubular construction.

The adhesive 13 is of the type which has no detrimental effect on the inner tube 11. This makes it possible to produce the hose 10 in high volume production using a tube 11 which has been presized during its manufacture and it is only necessary to control the configuration of the tube 11 during its manufacture without concern for the effective cross-sectional area of the hose 10 after braiding the outer cover 12 in position.

In this disclosure, the non-rigid elastomeric adhesive 13 has been used to bond a braided outer cover 12 to a plastic tube 11. However, it will be appreciated that the method of this invention may be employed to bond a plurality of tubular reinforcement layers to each other as well as to an inner tube or tubular construction. In addition, the adhesive 13 may be used to bond a protective sleeve over a reinforcing outer layer, or the like.

The hose 10 may be comprised of any suitable material or combination of materials. In addition, the adhesive 13 may be used to bond various types of materials such as polyester, cotton, rayon, fiberglass, urethane, polyethylene, vinyl, and nylon to each other and in any desired combination. The adhesive 13 may be employed to bond not only tubular constructions to each other but also sheet-like members.

It has also been found that a hose 10 which provides superior performance may be made using a tube 11 made of nylon and providing such tube with a braided cover made using continuous filament nylon yarn.

While present exemplary embodiments of this invention, and methods of practicing the same, have been illustrated and described, it will be recognized that this invention may be otherwise variously embodied and practiced within the scope of the following claims.

What is claimed is:

1. A flexible hose comprising an inner flexible plastic tube, a layer of noncured elastomeric adhesive on said tube, and an outer cover braided against said layer, said adhesive serving as a resilient elastic connection between said tube and said cover.

2. A hose as set forth in claim 1 in which said outer cover is made of continuous filament yarn which is braided against said layer.

3. A hose as set forth in claim 1 in which said tube comprises a nylon tube, said cover is made of continuous filament nylon yarn, and said adhesive is comprised of a low molecular weight polyvinyl ethyl ether resin to improve its adhesive properties and a high molecular weight polyvinyl ethyl ether resin to improve its cohesive properties.

4. A hose as set forth in claim 3 in which said adhesive is comprised of said low molecular weight resin within the range of approximately 25 to 75 parts by weight, said high molecular weight resin within the range of approximately 25 to 75 parts by weight, phenolic resin within the range of approximately 10 to 100 parts by weight, and solvent as needed.

5. A hose as set forth in claim 4 in which said solvent comprises methyl ethyl ketone.

6. A hose as set forth in claim 4 in which said solvent comprises toluene.

7. A hose as set forth in claim 1 in which said adhesive is in the form of a solvent release adhesive.

8. A hose as set forth in claim 7 in which said solvent release adhesive is comprised of an uncured elastomer capable of a high degree of hydrogen bonding blended with stabilizers and solvents.

9. A hose as set forth in claim 1 in which said adhesive is in the form of a hot melt adhesive.

10. A hose as set forth in claim 9 in which said hot melt adhesive has good hydrogen bonding characteristics and is comprised of resins and reinforcement additives.

* * * * *